United States Patent [19]

Holley

[11] 4,325,620
[45] Apr. 20, 1982

[54] FILM AND METHOD FOR TESTING CAMERAS

[76] Inventor: Gary R. Holley, 220 Bryan Pl., Mesquite, Tex. 75149

[21] Appl. No.: 202,016

[22] Filed: Oct. 28, 1980

[51] Int. Cl.³ ........................ G03B 15/02; G03B 17/26
[52] U.S. Cl. .................................... 354/127; 354/128; 354/275
[58] Field of Search ............... 354/127, 128, 139, 203, 354/157, 161, 198, 275

[56] References Cited

U.S. PATENT DOCUMENTS

| 780,284 | 1/1905 | Hahn | 354/275 |
|---|---|---|---|
| 1,631,299 | 6/1927 | Washington | 354/157 |
| 1,755,452 | 4/1930 | Motti | 354/161 |
| 2,147,106 | 2/1939 | Nuchterlein | 354/203 |
| 2,200,007 | 5/1940 | Mihalyi | 354/161 |
| 2,332,587 | 10/1943 | Mendelsohn et al. | 354/128 X |
| 2,428,818 | 10/1947 | Simons | 354/128 X |
| 3,295,408 | 1/1967 | Rab | 354/198 X |
| 3,719,130 | 3/1973 | Scott | 354/275 X |
| 3,820,874 | 6/1974 | Scarpetti | 350/130 |
| 3,899,245 | 8/1975 | Bernhardt | 352/72 |

Primary Examiner—Donald A. Griffin
Attorney, Agent, or Firm—Richards, Harris & Medlock

[57] ABSTRACT

A test film (10) is provided that is a translucent film (32) dimensioned and adapted for loading into a camera as photographic film. The translucent film material allows an image to be viewed thereon when the shutter of the camera (12) is open, which image is identical to the image that would be captured by photographic film. In accordance with the method of the present invention, the focus, picture image quality, shutter speed and flash synchronization of the camera (12) can be tested utilizing the test film (10) of the invention.

10 Claims, 4 Drawing Figures

U.S. Patent    Apr. 20, 1982    4,325,620

FILM AND METHOD FOR TESTING CAMERAS

TECHNICAL FIELD

This invention relates to a test film and method for testing cameras. More particularly, the invention relates to a test film and method that allows evaluation of the performance of a camera with respect to focus, picture image quality, shutter speed and flash synchronization.

BACKGROUND ART

The increasing complexity of cameras that are now being designed and manufactured has made it very difficult for the average person to test and evaluate the performance of such cameras. Further, however ruggedly constructed, a camera is essentially a precision instrument and slight variations in alignment or quality of the camera components can result in an observable loss of picture quality. To directly check a camera, it is necessary for one to have special equipment and skills in order to test cameras for focus, picture image quality, shutter speed and flash synchronization. Alternatively, one can indirectly check a camera by taking pictures with the camera, developing the film and evaluating the camera on the basis of the quality and type of picture obtained. However, such an evaluation of a camera often leaves doubt as to whether the camera was being operated properly, such as whether the camera was focused and otherwise adjusted properly. Further, it is difficult to evaluate a large number of cameras in this manner in a short time.

Therefore, a need exists for a simple and efficient device and method for testing the operation of cameras, and single lens reflex cameras in particular, since these are the most common, versatile and advanced. Further, a need also exists for a device and method of testing cameras that does not require the taking of actual pictures or the use of complicated and expensive test equipment, and which allows one to easily and quickly check the performance of the camera with respect to focus, picture image quality, shutter speed and flash synchronization.

DISCLOSURE OF THE INVENTION

In accordance with the present invention, a device and method are provided for testing the operation of reflex cameras with respect to focus, picture image quality, shutter speed and flash synchronization.

In accordance with the device of the present invention, a test film is provided that is a translucent film dimensioned and adapted for loading into a camera as photographic film. The translucent film material allows an image to be viewed thereon when the shutter of the camera is open, which image is identical to the image that would be captured by photographic film.

In accordance with another aspect of the present invention a method is provided in which focus, picture image quality, shutter speed and flash synchronization of the camera can be evaluated. The method includes the steps of loading the camera with the test film, advancing the test film such that the test film is in the film plane of the camera and focusing the camera on an object through its viewfinder. The shutter of the camera is then held open and the image formed on the test film is observed and inspected for sharpness and detail. Thus, the test film of the present invention allows one to immediately view the exact image that would be captured by photographic film.

In accordance with another embodiment of the method of the present invention, the shutter speed and flash synchronization of a camera having a flash attachment is also provided that includes loading a test film in accordance with the invention into the camera, setting the aperture of F-stop of the camera at its widest setting and setting the camera shutter speed to the flash synchronization speed setting. Thereafter, the camera is aimed at a low light area. The shutter is activated to thereby activate the flash attachment and form a visible image on the test film during the time that the shutter is open. The length of the image formed on the test film when the shutter is activated is measured. If the camera is functioning properly, the length of the image formed on the test film will be at least a certain predetermined length.

BRIEF DESCRIPTION OF THE DRAWINGS

The invention can be more completely understood from the following Detailed Description which refers to the accompanying drawings in which.

DETAILED DESCRIPTION

The present invention provides a test film and method for testing the focus, picture image quality, shutter speed and flash synchronization of cameras. The test film can be utilized in any type of camera, including motion picture cameras, in which an image that is formed on the test film while the camera shutter is open can be viewed. Similarly, the method of the present invention that relates to focus and picture image quality can also be used on any of the aforesaid cameras. The method of the present invention that relates to shutter speed and flash synchronization is generally applicable only to still cameras.

Figure 1:
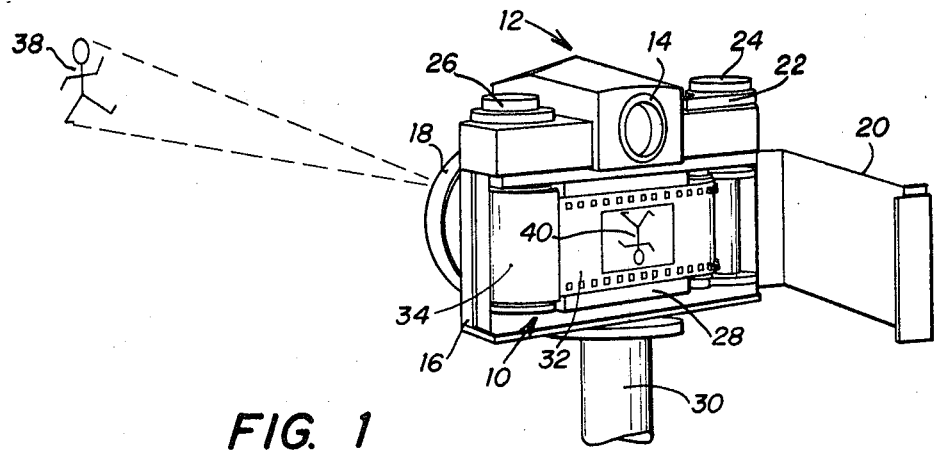
FIG. 1 is a perspective view of the test film of the present invention loaded in a camera that is mounted on a tripod focused on an object.

In accordance with the test device of the present invention, a translucent film material is provided that is dimensioned and adapted for loading into a camera as if the transparent film were photographic film. Referring to FIG. 1, there is depicted a test film 10 in accordance with the present invention that has been loaded into a camera 12. Camera 12 is a single lens 35 millimeter reflex camera and includes a viewfinder 14, a frame 16, a lens 18, a film cover 20, a film advance mechanism 22, a shutter and film speed dial 24, a rewind knob 26 and a film frame 28. Film frame 28 defines the film plane of camera 12. Camera 12 is mounted on a tripod 30 in FIG. 1 for preventing unwanted movement of camera 12 which facilitates testing. A detailed explanation of the camera components and operation of the camera is omitted, since the invention relates to a test film and method for utilizing the test film in evaluating the performance of cameras.

Figure 2:
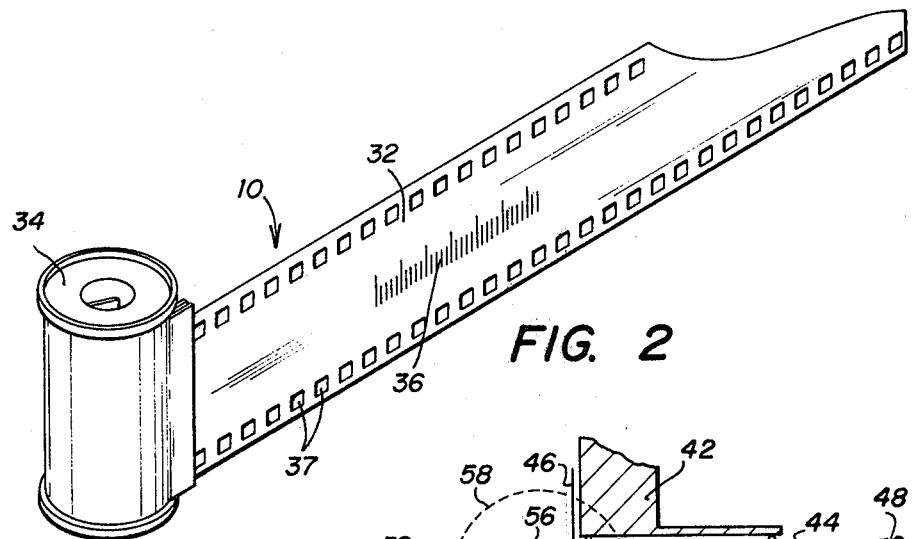
FIG. 2 is a perspective view of the test film in accordance with the present invention.

As shown in FIG. 1 and in more detail in FIG. 2, one embodiment of the test film includes a translucent film material 32 and a film canister 34. In accordance with a preferred embodiment, a scale 36 is provided on translucent film material 32, the use of which will be hereinafter described. Scale 36 can be in any suitable units, such as millimeters, for example. Since test film 10 is for use in a 35 millimeter camera, the dimensions of translucent film 32 are identical to 35 millimeter film, and includes perforations 37 normally provided in 35 millimeter film. Film canister 34 is a standard 35 millimeter canister. This facilitates use of the test film and ensures that the test film will be in the same position on the film frame that photographic film would occupy in the camera.

Test film 10 includes translucent film material 32 which can be any suitable material which allows the formation of an image thereon when the shutter of camera 12 is opened. For example, translucent film material 32 may be a material such as a translucent polyester film. One particular type of polyester film that is suitable is translucent "Mylar". "Mylar" is a trademark for a polyester film manufactured by the E. I. DuPont De Nemours, Company. The use of such material is not a limitation upon the invention and any translucent film material upon which an image can be formed as previously described can be utilized.

The method in accordance with the present invention that allows the camera to be tested with respect to focus, picture image quality, shutter speed and flash synchronization will now be described with reference to FIG. 1. As shown in FIG. 1, camera 12 has been loaded with test film 10 and advanced so that the test film is in the film plane of camera 12. Camera 12 has been focused on an object 38 through viewfinder 14. The shutter of camera 12 is then held open and an image 40 of object 38 is formed on translucent film 32. Image 40 can then be inspected for sharpness and detail. Since translucent film 32 is in the film plane of camera 12, the image formed on translucent film 32 is identical to the image that would be captured by photographic film in camera 12. Image 40 should be inspected for sharpness and clarity. A magnifying glass can also be used to facilitate the examination of the image. If image 40 is not in the same focus as when viewed in viewfinder 14, this indicates that camera 12 is not functioning properly.

The shutter speed and flash synchronization of a camera having a flash attachment and variable shutter speeds and aperture settings is also evaluated with the test film provided. After the test film has been loaded and advanced such that the test film is in the film plane of the camera, the aperture or F-stop setting of the camera is set to the widest setting. The camera shutter speed is set to the flash synchronization speed setting for the camera. This is generally 1/30th of a second or 1/60th of a second for most cameras. The camera is then aimed at a low light area and with the back of the camera opened, the shutter is activated thereby activating the flash attachment and forming a visible image on the test film during the time the shutter is open. The length of the image formed on the test film when the shutter is activated is measured. If the camera is functioning properly, the length of the image formed on the test film will be at least a certain predetermined length. For example, in a 35 millimeter single lens reflex camera, generally the reflex flash synchronization shutter speed will be 1/30th or 1/60th of a second and the length of the image formed on the test film when the aperture is set at its widest setting should be at least 35 millimeter. This indicates that the flash synchronization of the camera is correct. To further test the synchronization of the camera and shutter speed, the shutter is set to the next faster speed leaving the aperture at its widest setting. The camera is again aimed at a low light area and the shutter activated thereby activating the flash attachment to form a visible image on the test film during the time that the shutter is open. The length of the image formed on the test film when the shutter is open is measured. The inverse ratio of the length of the image formed at the two shutter speeds and the ratio of the respective shutter speeds should be equal if the camera shutter is functioning properly. For example, if the next faster shutter speed is 1/60th of a second and the flash synchronization shutter speed was 1/30th of a second, the ratio of the image lengths for those shutter speeds should be (1/30)(1/60) or 2. Therefore the size of the image at 1/60th of a second should be the inverse of 2 or ½. The test can be continued by setting the shutter to the next faster shutter speed, determining the length of the image formed thereon and comparing the inverse ratio of the length of the image formed with the ratio of the respective shutter speed utilized to form those images. Since the image will be visible on the test film only for the time that the shutter is open, it may be necessary to shoot the camera at the same shutter speeds in order to determine the length of the image formed on the test film.

Figure 3:
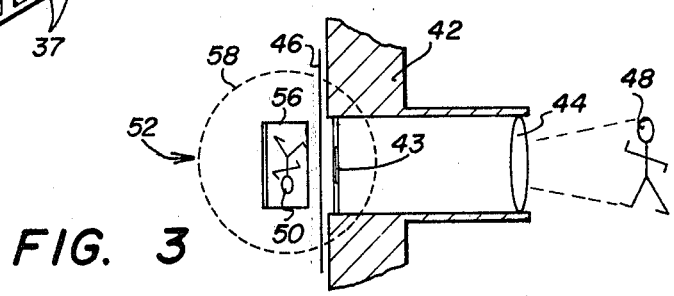
FIG. 3 is a side elevational view of a test film in accordance with the present invention loaded in a motion picture camera together with a device that permits viewing of the image formed on the test film.
Figure 4:
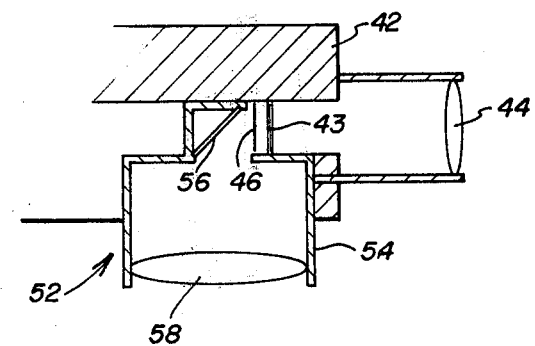
FIG. 4 is a top elevational view of the camera as shown in FIG. 3.

Referring to FIG. 3 and 4, there is depicted a schematic illustration of the present invention being utilized in a movie camera for determining focus and picture image quality. A portion of a movie camera 42 is illustrated including a shutter 43 and a lens 44. A test film 46 is loaded in camera 42 and is shown in position in the film plane of camera 42. Camera 42 is focused on an object 48 which forms a visible image 50 on test film 46 when shutter 43 is activated. Since it is difficult to view the image of object 48 on test film 46 because of the nature of the movie camera, a viewing device 52 is provided. Viewing device 52 includes a base 54, a mirror 56 and a magnifying glass 58. The portion of base 54 is adapted for insertion adjacent the film plane of camera 42. Mirror 56 is mounted to base 54 at approximately a 45° angle to the film plane of camera 42. Magnifying glass 58 is mounted to base 54 approximately perpendicular to the film plane of camera 42 and at a 45° angle to mirror 56 thereby allowing a viewer to inspect image 50 formed upon test film 46 of object 48 when shutter 43 is activated.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. The present invention is therefore intended to encompass such rearrangements, modifications and substitutions of parts and elements as fall within the scope of the appended claims.

We claim:

1. A test film for use in reflex cameras for testing the operation of the camera with respect to focus and picture image quality comprising a translucent and fully reusable film material dimensioned and adapted for loading into the camera, the translucent film material being contained in a standard film cartridge for the reflex camera.

2. The test film as recited in claim 1 further comprising a scale on said translucent film material for determining the length of an image formed thereon.

3. A method for testing the performance of cameras comprising:
   (a) loading the camera with a test film, said test film constructed of translucent film material corresponding in size to the photographic film normally used in the camera;
   (b) advancing said test film so that said test film is in the film frame of the camera;
   (c) focusing the camera on an object through the viewfinder of the camera;
   (d) observing and inspecting the image of the object formed on the test film while the shutter of the camera is open; and
   (e) comparing the image viewed through the viewfinder with the image observed on the test film.

4. The method as recited in claim 3 further comprising utilizing a magnifying glass to observe and inspect the image formed on said film.

5. The method as recited in claim 3 wherein the camera is a 35 millimeter reflex camera.

6. The method as recited in claim 3 wherein the camera is a motion picture camera.

7. A method for testing the shutter speed and flash synchronization of a camera having a flash attachment, adjustable aperture settings, and adjustable shutter speeds, comprising:
   (a) loading a test film into the camera and advancing said test film so that said test film is in the film frame of the camera, said test film constructed of translucent film material corresponding in size to the type of photographic film normally used in the camera;
   (b) setting the aperture of the camera at its widest opening;
   (c) setting the camera shutter speed to the flash synchronization speed setting;
   (d) aiming the camera at a low light area;
   (e) activating the shutter to thereby activate the flash attachment and form a visible image on the test film during the time that the shutter is open; and
   (f) measuring the length of the image formed on the test film when the shutter is open.

8. The method as recited in claim 7 wherein the test film has a longitudinal scale thereon for facilitating measurement of the length of said image.

9. The method as recited in claim 7 further comprising:
   (a) setting the shutter speed at the next faster shutter speed and repeating steps (d) through (f) of claim 7;
   (b) comparing the ratio of the lengths of the images formed in steps (a) through (f) of claim 7 and step (a) of claim 1 with the inverse ratio of the respective shutter speeds utilized to form said images.

10. The method as recited in claim 9 further comprising:
    (a) setting the shutter speed to the next faster shutter speed than the shutter speed of step (a) in claim 9 and repeating steps (d) through (f) of claim 7; and
    (b) comparing the ratio of the length of the images formed in step (a) of claim 9 with the inverse ratio of the respective shutter speeds utilized to form said images.

* * * * *